United States Patent [19]

Dopheide et al.

[11] Patent Number: 4,923,298
[45] Date of Patent: May 8, 1990

[54] DEVICE FOR MEASURING THE SPEED OF MOVING LIGHT-SCATTERING OBJECTS

[75] Inventors: Dietrich Dopheide; Michael Faber, both of Brunswick; Gerhard Reim, Rothemuehle; Guenter Taux, Brunswick, all of Fed. Rep. of Germany

[73] Assignee: Federal Republic of Germany, represented by the Federal Minister for Economics, who is in turn represented by the President of the Physical-Technical Federal Institute, Brunswick, Fed. Rep. of Germany

[21] Appl. No.: 194,239

[22] Filed: May 16, 1988

[30] Foreign Application Priority Data

May 15, 1987 [DE] Fed. Rep. of Germany ....... 3716249
Oct. 30, 1987 [DE] Fed. Rep. of Germany ....... 3736805

[51] Int. Cl.[5] ...................... G01P 3/36; H01L 31/14
[52] U.S. Cl. .................................. 356/28.5; 250/553
[58] Field of Search ................. 356/28, 28.5; 250/553

[56] References Cited

U.S. PATENT DOCUMENTS

| 3,691,390 | 9/1972 | Chow et al. | 250/553 |
| 3,902,803 | 9/1975 | Lego | 250/553 |
| 3,967,899 | 7/1976 | O'Meara | 250/553 |
| 4,483,614 | 11/1984 | Rogers | 356/28.5 |
| 4,537,503 | 8/1985 | Liu | 356/28.5 |
| 4,669,876 | 6/1987 | Dopheide | 356/28.5 |

FOREIGN PATENT DOCUMENTS

3435423A1 2/1984 Fed. Rep. of Germany .

OTHER PUBLICATIONS

"Beam Scanning with Twin-Strip Injection Lasers", D. R. Scifres, W. Steifer, and R. D. Burnham, Appl;. Phys. Lett., vol. 33, No. 8, Oct. 15, 1978.
Dopheide et al., "Geschwindigkeits–Und Durchflubmessung Mit Optoelektronischen Bauelementen" (Velocity and Flowrate Measurements Using Opto-electronic Devices), Technisches Messen tm, 52, Jahrgang, Heft, 6/1985, pp. 253–263.
"Das Lichtzonen-Anemometer", Dobrinski et al., Messen Prufen Automatisieren, Jul./Aug. 1986, pp. 416–420.

*Primary Examiner*—Stephen C. Buczinski
*Attorney, Agent, or Firm*—Foley & Lardner, Schwartz, Jeffery, Schwaab, Mack, Blumenthal & Evans

[57] ABSTRACT

In a device for measuring the speed of moving light-scattering objects by means of laser beams, with which a periodic intensity distribution (4) is produced at the measuring point (3), and by means of a detecting device (5, 7; 8, 9, 10) for light scattered by the object, it is possible to produce the periodic intensity distribution in a simple fashion with a laser diode array (1) in which a plurality of laser diodes are arranged at a defined separation from one another. Light emitted by the laser diode is focussed at the measuring point (3) with a focusing optical system (2). In addition, when measuring speed it is possible to discriminate direction by arranging the laser diode array (1, 13) such that no emission occurs in at least one such location (11') of the laser diode (11), so that an asymmetric intensity distribution is produced at the measuring point (3).

18 Claims, 4 Drawing Sheets

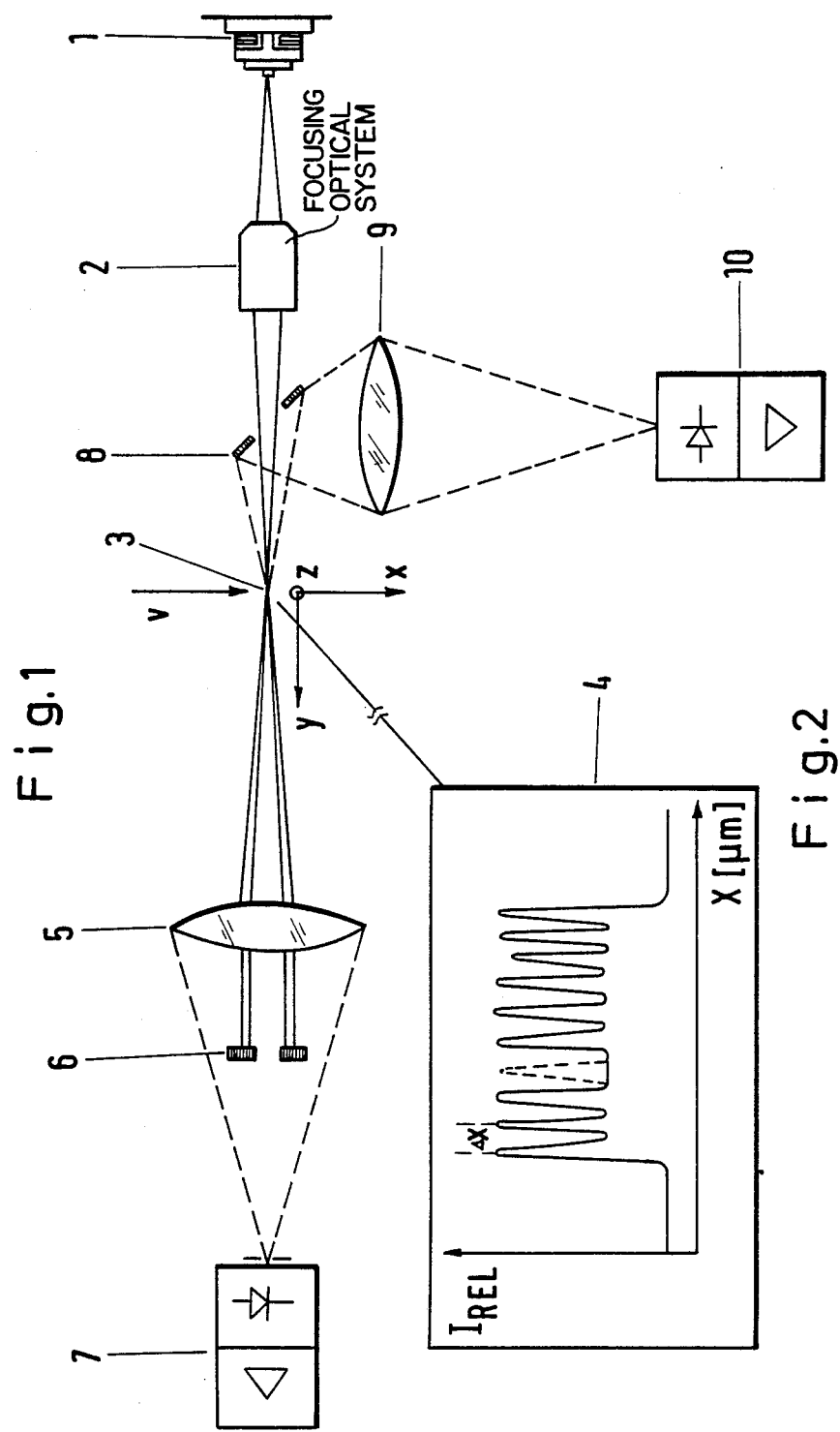

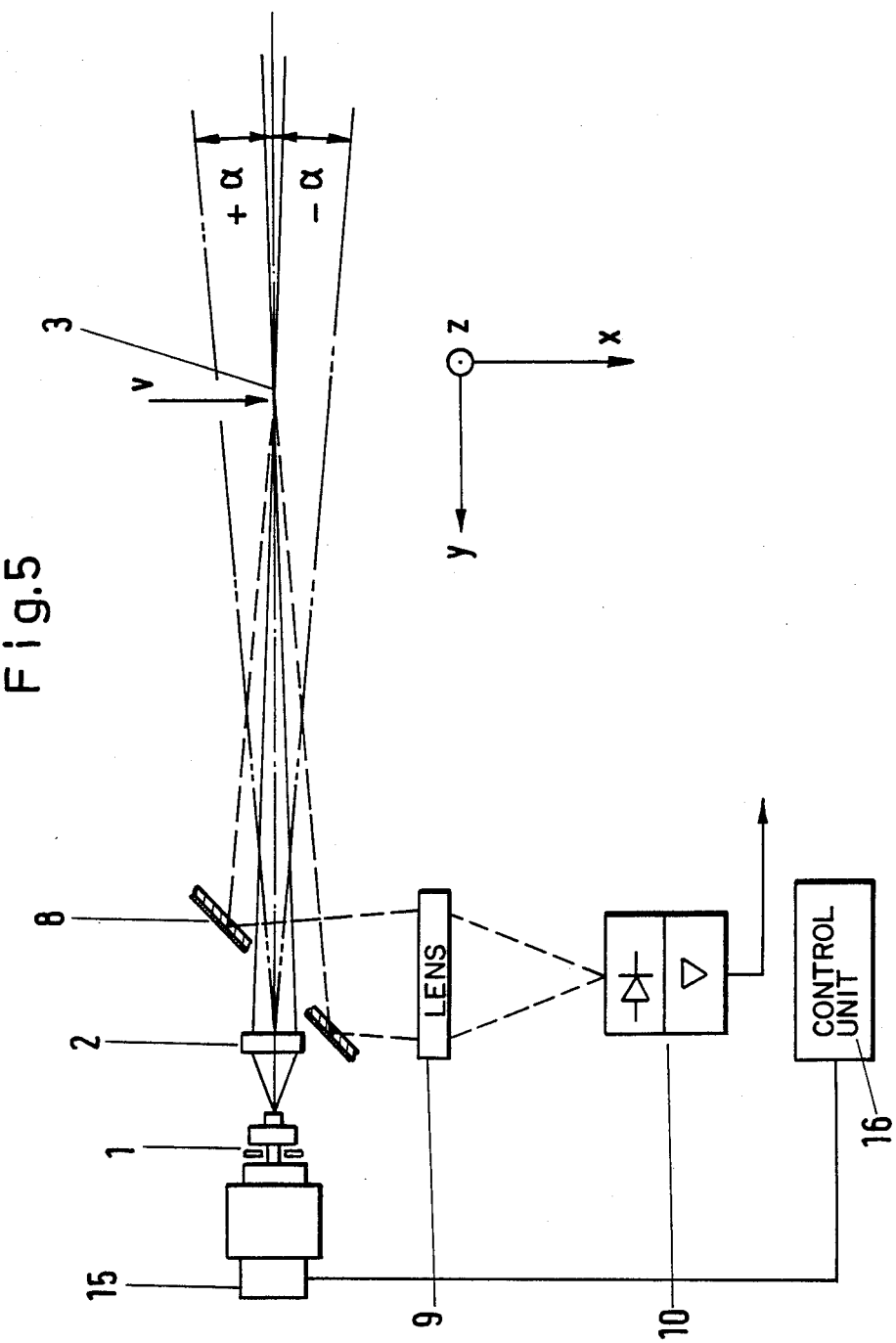

DEVICE FOR MEASURING THE SPEED OF MOVING LIGHT-SCATTERING OBJECTS

BACKGROUND OF THE INVENTION

The invention relates to a device for measuring the speed of moving light-scattering objects by means of laser beams, with which a periodic intensity distribution is produced at the measuring point, and by means of a detecting device for light scattered by the object.

Such devices are known as laser anemometers. They serve especially to measure rates of flow such as in flowing fluids containing light-scattering particles. In the known technology, the periodic intensity distribution is produced in that two coherent component laser beams produce a virtual interference pattern at the measuring point. Because of the Doppler effect the pulse frequency for the light scattered by the particles traversing the measuring point is a function of speed. In the known technology, the frequencies can be evaluated using the detecting device for the light scattered by the object.

In order to produce a stable interference pattern at the measuring point, the light of the component beams must have a sufficient coherence length, so that presently, in practice, expensive lasers with a large space requirement have been used. It has already become known from German Offenlegungsschrift No. 34 35 423 to use laser diodes as well. In this case special measures have been employed to maintain a sufficient coherence length for the light emitted by the laser diodes so as to produce a stable interference pattern at the measuring point. In each case, the measurements depend greatly on external influences, which must be kept constant by means of appropriate controlling mechanisms.

SUMMARY OF THE INVENTION

It is the object of the invention to design an anemometer-type device in a way that it is possible to measure in the smallest space and comparatively independently of external influences.

This object is achieved according to the invention with a device of the type mentioned at the beginning in that a real periodic intensity distribution is produced with a laser diode array in which a plurality of laser diodes are arranged at a defined separation from one another, and emitted light is focused at the measuring point with a focusing optical system.

It follows that the device according to the invention is based on a different and surprisingly simple principle of producing the periodic intensity distribution at the measuring point. Whereas up to now the light of a single laser source has been evenly split into two component beams in order to produce the interference pattern, the device according to the invention requires only a single beam, which, however, comes from a plurality of laser diodes of a laser diode array which are arranged at defined separations from one another. The light from the plurality of laser diodes is imaged at the measuring point by the focusing optical system in such a way that a real periodic system of intensity maxima arises at the measuring point, which have a separation of $$\Delta x = M \cdot s$$

where s denotes the separation of the laser diodes in the laser diode array, and M the linear magnification.

By contrast to the single laser anemometer, at the measuring point the intensity maxima form a real system of light barriers, which are traversed by the moving object. The light scattered while traversing the light barriers is modulated with the pulse frequency $f_p$, where $$f_p = v/\Delta x.$$

v denotes the speed of the moving particle.

To make the evaluation, recourse may be had both to the light scattered forward and also to the light scattered backward. The evaluation of the scattering in the backward direction, in particular, makes it possible to have very small transmitting and receiving devices for measuring rates of flow. The device according to the invention is distinguished by an extremely simple construction of the measuring setup, for which only one emitted beam is required. Only very small viewing windows of a few millimeters in diameter are necessary for measuring rates of flow, so that use is possible in places where access is very difficult. The demands for coherence of the light are minimal. It is also possible to use noncoherent light. It is also possible to use the process according to the invention to measure the speed of solid surfaces by evaluating the backscattered light.

Since laser diode arrays of very high output power are feasible, it is also possible to carry out measurements of high speeds. Even sub-micron particles are sufficient for the flow measurement to be carried out.

Again, the device according to the invention enables simple speed measurements in two dimensions through the use of two-dimensional multi-stripe arrays.

In a very advantageous embodiment, the laser diode array does not emit at at least one location of the laser diode, so that an asymmetric intensity distribution is produced at the measuring point.

The arrangement of the laser diodes in a linear laser diode array is made in such a way that the particle whose velocity is to be measured generally completely traverses the periodic intensity distribution, which can be regarded as a plurality of light barriers. This gives rise to a scattered light signal having a periodic intensity distribution corresponding to the light barriers. If, now, one of the light barriers does not function, a characteristic behavior of this scattered light arises. When, in accordance with the invention, the laser diode array does not emit at such a location of a laser diode, so that an asymmetric intensity distribution arises, different intensity distributions of the scattered light are obtained for particles flowing in opposite directions. Consequently, the design of the laser diode array according to the invention makes it possible to discriminate the direction of motion of the particles in a simple way, whereas previously such discrimination could be obtained only with extreme difficulty. It can be readily seen that such a discrimination of direction is not possible with the previous static virtual intensity distributions produced by interference. Only the use of the laser diode arrays makes possible in a simple way the asymmetric intensity distribution at the measuring point according to the invention.

Preferably, the location at which the laser diode array does not emit is selected in the central region of the laser diode array, because this facilitates recognition of the measuring signal.

It is possible to suppress the emission of a light-emitting diode of the laser diode array. It is also possible, however, to use defective laser diode arrays in which one or more laser diodes do not emit, insofar as this guarantees an asymmetric arrangement for the various directions of flow. The demand for asymmetry means that the effect according to the invention will not be achieved with a laser diode array if an edge diode or, for an uneven number of laser diodes, the center diode is suppressed.

A similar statement holds for two-dimensional laser diode arrays.

In an advantageous embodiment, the laser diode array consists of laser diodes, the direction of emission of which can be varied by means of an electric control. Through appropriate control of the laser diodes by the control setup, the periodic intensity distribution is swiveled in a range of angles. In this way, it is possible to scan the "emission cone", and thus to cause a spatial movement of the measuring point. Laser diodes whose direction of emission can be varied with an electric control are known, for example, from Appl. Phys. Lett. 33 (8) of Oct. 15, 1978, pp. 702–704. The direction of emission can be changed by changing a ratio I1/I2 of two pump currents for the laser diodes.

BRIEF DESCRIPTION OF THE DRAWINGS

The invention will now be further explained with reference to an illustrative embodiment represented in the drawings, wherein FIG. 1 shows the schematic design of a device for speed measurement having a laser diode array and one detecting device each for detecting the light scattered forward or backward;

FIG. 2 shows a representation of the intensity distribution at the measuring point;

FIG. 5 shows the design according to FIG. 1 with a control setup for swiveling the intensity distribution.

DETAILED DESCRIPTION OF THE PREFERRED EMBODIMENTS

Figure 3:
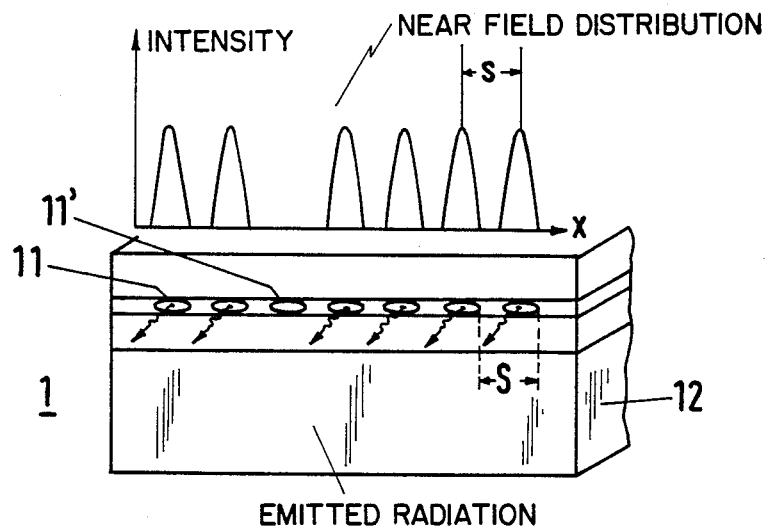
FIG. 3 schematically shows the design of a laser diode array with the associated near field distribution.

It is clear from FIG. 1 that the light emitted by a laser diode array 1, which will be further explained with reference to FIG. 3, is focused at a measuring point by a focusing optical system 2. The measuring beam has an intensity near field distribution 4 in the direction x, which corresponds with the direction of the rate of flow v if a fluid, as represented in FIG. 2. Corresponding to the number of the laser diodes in the laser diode array there are intensity maxima which are traversed by the particle moving at the rate of flow v. To evaluate the light scattered in the forward direction there is a lens 5 arranged in the forward direction which focuses the scattered light onto the input of photodiode 7 constructed as an avalanche diode. The light of the measuring beam transmitted through the flowing fluid is blocked off by a beam trap 6 behind the lens 5.

For the additional or alternative evaluation of the backward-scattered light there is provided an annular mirror 8, whose center point lies in the optical axis of the emitted beam so that the latter can pass unhindered through the annular mirror 8. The backward-scattered light is coupled out by the inclined annular mirror 8 and reaches a lens 9, which focuses the scattered light onto the input of a photodiode 10 corresponding to the photodiode 7.

The near field distribution represented in FIG. 2 shows the near field distribution of the intensity maxima produced by a linear laser diode array 1 with ten laser diodes, the fourth one of which is not emitting. The dashed line in FIG. 2 shows the intensity of its emission for the fourth laser diode in the case that it were to emit. Since this fourth laser diode does not emit, an asymmetric near field distribution arises, which makes it possible to discriminate from the scattered light whether the particle has traversed the remaining nine intensity maxima from left to right or from right to left.

FIG. 3 illustrates the design of a laser diode array 1 as used in the setup according to FIG. 1. Seven laser diodes 11 are arranged in lines next to one another in the laser diode array at constant separations from one another. Since the laser diodes 11 are arranged on a common substrate 12, their emission is generally phase-coupled, it being possible for the phase shift to be 0 or 180 degrees, for example. One laser diode 11' of the laser diodes 11 does not emit, for example, because it is defective or has been covered up. Accordingly, the near field distribution of the emitted intensity exhibits a gap at the location of the laser diode 11'. The near field distribution is also illustrated in FIG. 3. It exhibits six equal intensity maxima, which have a spacial separation s from one another, the gap arising owing to the non-emitting laser diode 11' having been taken into account. This near field distribution is imaged at the measuring point 3 via focusing optical system 2 as a near field distribution 4 corresponding to FIG. 2. The separation of the intensity maxima amounts to $\Delta x = M \cdot s$, where M stands for the linear magnification.

Figure 4:
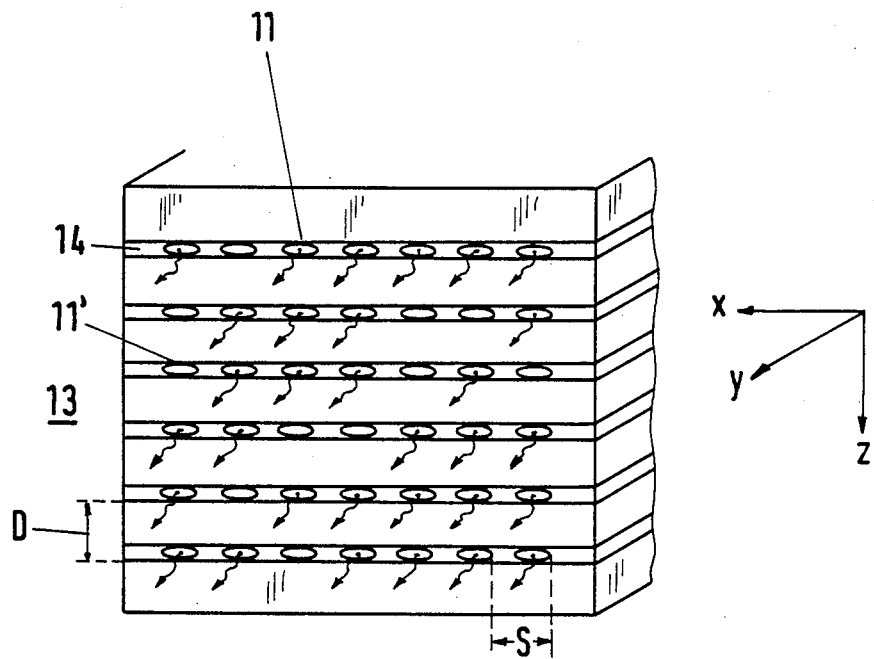
FIG. 4 shows a schematic representation of a two-dimensional laser diode array.

The laser diode array 13 has a two-dimensional arrangement of laser diodes 11, there being six stripes 14 of seven laser diodes 11 in each case in the illustrative embodiment shown in FIG. 4. Each stripe 14 corresponds to the single stripe of the laser diode array 1. The stripes 14 have a separation D from one another. The laser diode array causes a near field distribution of $6 \times 7$ intensity maxima, which have a separation from one another of s in the x direction and D in the z direction. This near field distribution is imaged on the measuring point 3 with the linear magnification M, so that it is possible to measure the speed component not only in the x direction but also in the z direction. It is also possible, therefore, to measure the true speed of particles moving at an angle in the x-z plane. The laser diode array 13 also has a number of non-emitting laser diodes 11', whose distribution in the laser diode array 13 ensures that depending on the direction with which the particular particle traverses the light barriers formed at the measuring point 3 by the laser diode array 13, different measuring signals arise owing to the scattered light, so that it is possible to identify the direction of flow of the particles.

FIG. 5 shows a setup which corresponds essentially to the setup of FIG. 1. For this reason, the same reference numerals have also been employed.

Here, the laser diodes 11 of the laser diode array 1 are current controlled by a control unit 16 via a network 15 in such a way that the individual phase-coupled laser diodes 11 of the laser diode array 1 emit in a pre-set direction of emission, so that the intensity distribution produced at the measuring point 3 by the laser diode array 1 can be adjusted in a range of angles $+\alpha, -\alpha$. By varying the control currents it is possible to cause the intensity distribution at the measuring point 3 to migrate during the measurement. This supplements the measuring possibilities with the device according to the invention, there being, for example, the possibility of discrimination of direction and of electronic scanning for the purpose of measuring the velocity fields, that is to detect local speeds at the various measuring points 3 in the range of angles $+\alpha$, $-\alpha$.

What is claimed is:

1. A device for measuring the speed of light-scattering objects comprising:
   (a) a laser diode array having a plurality of laser diodes arranged on a common substrate spaced apart from one another by predetermined separations, said laser diodes emitting light having an intensity distribution;
   (b) an optical system focusing said light from said laser diodes to a measurement region through which said light-scattering objects pass;
   (c) said laser diode array and optical system producing a real spatially periodic intensity distribution at said measurement region by imaging said intensity distribution of said emitted light of said laser diodes; and
   (d) output means, including at least one detector positioned for receiving light scattered from said light-scattering objects passing through said measurement region, for evaluating the frequencies of said scattered light to produce an output proportional to said speed of said light-scattering objects.

2. A device according to claim 1, wherein said laser diode array comprises a two-dimensional array.

3. A device according to claim 1, wherein at least one of said laser diodes in said laser diode array does not emit light, so that an asymmetric intensity distribution is produced at the measurement region.

4. A device according to claim 2, wherein said two-dimensional array comprises a plurality of linearly arranged rows of laser diodes and wherein at least one of said laser diodes in each row does not emit radiation.

5. A device according to claim 1, wherein said periodic intensity distribution is distributed through a measurement region extending parallel to the direction of travel of said light-scattering objects.

6. A device according to claim 1 further comprising electronic means for controlling the direction of emission of said light from said laser diode array.

7. A device according to claim 2 further comprising electronic means for controlling the direction of emission of said light from said laser diode array.

8. A device according to claim 3 further comprising electronic means for controlling the direction of emission of said light from said laser diode array.

9. A device according to claim 4 further comprising electronic means for controlling the direction of emission of said light from said laser diode array.

10. A device according to claim 6, wherein said electronic means comprises means for varying the periodic intensity distribution within a fixed range.

11. A device according to claim 1, wherein said predetermined separations are all equal to one another.

12. A device as claimed in claim 1, wherein said laser diodes are linearly arranged and wherein said predetermined separations are all equal to one another.

13. A device as claimed in claim 1, wherein said at least one detector is positioned to measure forward-scattering light from said light-scattering objects.

14. A device as claimed in claim 1, wherein said at least one detector is positioned to measure backward-scattering light from said light-scattering objects.

15. A device as claimed in claim 13 further including an additional detector position to receive backward-scattered light from said light-scattering objects.

16. A device as claimed in claim 1 further comprising an additional optical system for focusing light scattered from said objects to said at least one detector.

17. A method of measuring the speed of light-scattering objects comprising the steps:
   (a) generating a plurality of light beams from an array of linearly arranged light emitting diodes positioned apart from one another by predetermined spacings;
   (b) imaging said light beams to form a spatially periodic intensity distribution at a measurement region through which said light-scattering objects pass; and
   (c) measuring light reflected from said light-scattering objects to determine the speed of said objects through said measurement region.

18. A method as recited in claim 17, wherein said generating step includes generating light from each of said laser diodes except for one of said laser diodes which is asymmetrically positioned with respect to the remainder of said laser diodes thereby providing an asymmetric intensity distribution in said measurement region, and measuring said light from said light-scattering objects.

* * * * *